(12) United States Patent
Baehr

(10) Patent No.: US 7,231,287 B2
(45) Date of Patent: Jun. 12, 2007

(54) GEARBOX AND METHOD FOR CONTROLLING A CLUTCH, ESPECIALLY A DOUBLE CLUTCH

(75) Inventor: Markus Baehr, Achern (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 228 days.

(21) Appl. No.: 11/106,199

(22) Filed: Apr. 14, 2005

(65) Prior Publication Data
US 2005/0194228 A1    Sep. 8, 2005

Related U.S. Application Data

(63) Continuation of application No. PCT/DE03/03359, filed on Oct. 10, 2003.

(30) Foreign Application Priority Data
Oct. 16, 2002    (DE)    ................ 102 48 156

(51) Int. Cl.
G06F 17/00    (2006.01)
G06F 19/00    (2006.01)

(52) U.S. Cl. .................... 701/67; 701/113; 74/335; 74/473.25; 74/360; 239/670

(58) Field of Classification Search .................. 701/67
See application file for complete search history.

(56) References Cited

U.S. PATENT DOCUMENTS

| | | | | |
|---|---|---|---|---|
| 4,732,330 A | * | 3/1988 | Groeneveld et al. | ........ 239/670 |
| 5,172,602 A | * | 12/1992 | Jurgens et al. | ................ 74/335 |
| 5,407,401 A | | 4/1995 | Bullmer et al. | |
| 5,802,916 A | * | 9/1998 | Ebinger et al. | ................ 74/360 |
| 5,924,327 A | * | 7/1999 | Neubauer et al. | ........ 74/473.25 |

FOREIGN PATENT DOCUMENTS

| | | |
|---|---|---|
| DE | 10036820 | 2/2002 |
| EP | 1067008 | 1/2001 |
| EP | 1354751 | 10/2003 |

* cited by examiner

*Primary Examiner*—Thomas Black
*Assistant Examiner*—McDieunel Marc
(74) *Attorney, Agent, or Firm*—Simpson & Simpson, PLLC

(57) ABSTRACT

A method for controlling a clutch, especially a double clutch, an interruption-free manually controlled gearbox, especially a parallel gearbox. A common torque mapping for controlling the clutches is created according to the respective base torque mapping of each clutch. An interruption-free manually controlled gearbox, especially a parallel gearbox, for a vehicle having a double clutch, especially for carrying out said method. At least one control device produces a common torque mapping in order to control the double clutches according to the respective base torque mapping of each clutch.

27 Claims, 1 Drawing Sheet

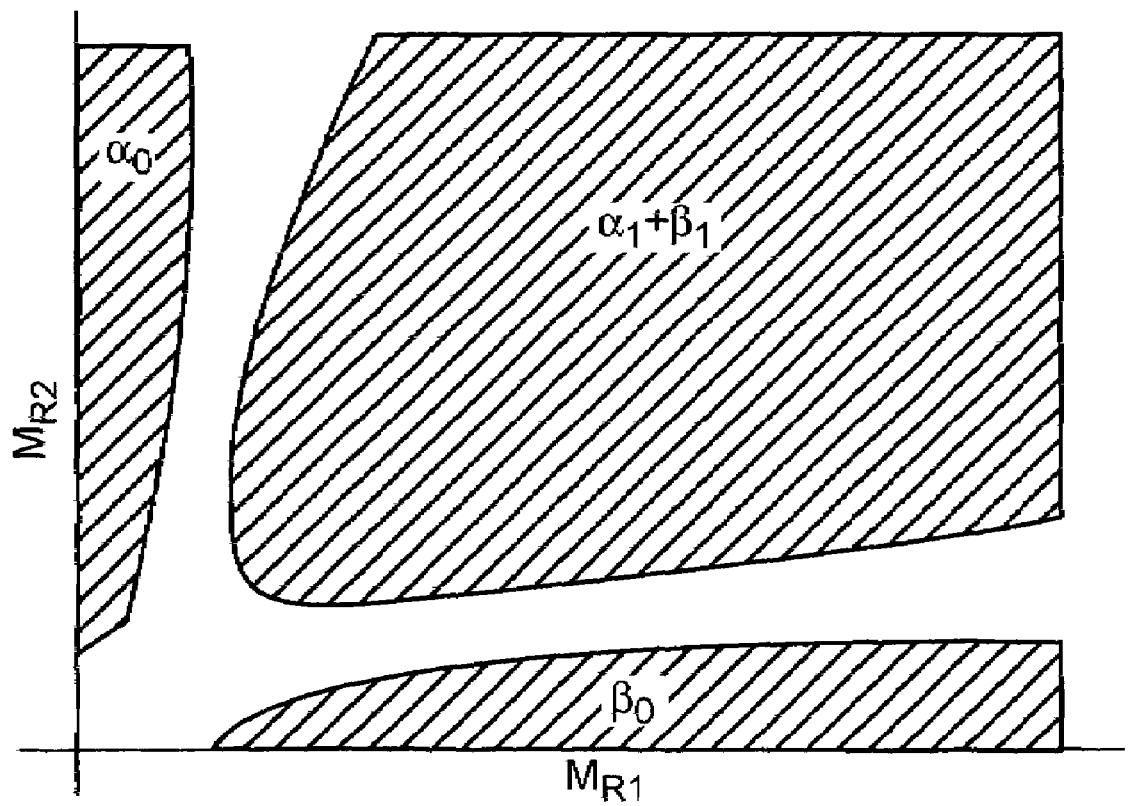

GEARBOX AND METHOD FOR CONTROLLING A CLUTCH, ESPECIALLY A DOUBLE CLUTCH

CROSS REFERENCE TO RELATED APPLICATIONS

This application is filed under 35 U.S.C. §120 and §365(c) as a continuation of International Patent Application PCT/DE2003/003359, filed Oct. 10, 2003, which application claims priority of German Patent Application 102 48 156.3, filed Oct. 16, 2002, which application is incorporated herein by reference.

FIELD OF THE INVENTION

This invention relates to a gear and a method for controlling a clutch, in particular, a double clutch of an interruption-free gearbox, in particular, a parallel gearbox.

BACKGROUND OF THE INVENTION

Gears and methods for controlling a clutch of a gear are sufficiently well known in vehicle technology. For example, interruption-free gearboxes, for example, double clutch gears or parallel gearboxes with a double clutch that is coupled with two sub-gears, are used in vehicles.

During a simulation of a double clutch, where both sub-clutches are provided on one clutch cover, it was found that a definite cross-coupling can occur during moment control.

SUMMARY OF THE INVENTION

The object of the invention accordingly is to propose a gear and a method for controlling a clutch, especially a double clutch of an interruption-free gearbox, in particular, a parallel gearbox of the kind mentioned initially, where, by providing a suitable control of the clutch moments, one can especially prevent a cross-coupling during the double clutch action.

The object of this invention can be attained by an invention-based method for controlling a clutch, in particular, a double clutch of an interruption-free gearbox, in particular, a parallel gearbox, where, as a function of the particular base moment performance characteristic of each clutch, one can provide a common moment performance characteristic for the purpose of controlling the clutches. In that way, one can implement a preferably adaptable characteristic diagram for the double clutches of the gear.

The following different possibilities can be listed in accordance with the invention in order to provide moment performance characteristics for the two sub-clutches. In each case, the characteristic diagrams of the individual clutches, used as base characteristic diagrams, are employed as foundation. With a series of supporting points, the latter can reproduce the development of the clutch moment via the actuator position of a clutch when, for example, the other sub-clutch does not transmit any moment.

As part of a development of the invention, it can be provided that the base characteristic diagrams ($M_{RO1}(Pos1)$ and $M_{RO2}(Pos2)$), for example, during startup and during the synchronization phase in gearboxes, are adapted separately in a preferred manner.

According to the next embodiment, the following requirements can be mentioned by way of example as requirements for the particular characteristic diagram for the two sub-clutches.

The deviation between a characteristic diagram and the actual clutch moment should be as small as possible, for example, less than 10 Nm. Furthermore, it should be possible to adapt the characteristic diagrams preferably to changes in the clutch properties, which are caused, for example, by different parameters such as the friction number change, wear and tear, and adjustment or the like. Moreover, it should be possible to adapt the characteristic diagrams during routine operation. The more frequently it is possible to adapt the characteristic diagrams, the better will the result be.

In the case of the invention-based method, overriding can be considered in different ways. First of all, overriding can be prevented, for example, by suitable moment influencing. Here, for example, one can directly consider the changes of the clutch moments as a function of the moment of the other particular clutch.

Another development of the invention can provide that preferably several override parameters be adapted. To determine these parameters, one can, for example, compare the calculated values for the clutch moments and the real measured clutch moments with each other. But one could in a preferred manner always use positions where both clutches transmit one moment, because, otherwise, there is no override.

The next embodiment of the invention at hand can provide that the parameters $\alpha_0$ and $\beta_0$ are advantageously determined in case of a heavily asymmetrical loading of the clutches, whereas both clutches are supposed to transmit moment in a sliding manner for the determination of the parameters $\alpha_1$ and $\beta_1$.

The parameters $\alpha_0$ and $\beta_0$ can, for example, be determined according to the following equation:

$$\alpha_0 = \frac{M_{RO1}(Pos1) - M_{R1}(Pos1, Pos2)}{M_{RO2}(Pos2)}$$

and $$\beta_0 = \frac{M_{RO2}(Pos2) - M_{R2}(Pos1, Pos2)}{M_{RO1}(Pos1)}$$

On the basis of the system properties, one can only measure the sum of the transmitted clutch moments when there are two sliding clutches. Therefore, $\alpha_1$ and $\beta_1$ can also be determined only as a sum. This can be done as follows, for example:

$$\alpha_1 + \beta_1 = \frac{(1-\beta_0)M_{RO1}(Pos1) + (1-\alpha_0)M_{RO2}(Pos2) - (M_{R1} + M_{R2})}{M_{RO1}(Pos1)M_{RO2}(Pos2)}$$

It has been found that this sum is preferably subdivided over the individual parameters:

$$\alpha_1 = 0.5\left(\frac{\alpha_0}{\alpha_0 + \beta_0} + 0.5\right)(\alpha_1 + \beta_1)$$

and $$\beta_1 = 0.5\left(\frac{\beta_0}{\alpha_0 + \beta_0} + 0.5\right)(\alpha_1 + \beta_1)$$

The performance of the adaptation of the parameters $\alpha_0$ and $\beta_0$ is described below. Here we consider first of all the touch-point shift due to the overriding of the other particular clutch.

Due to the override, the touch point on the clutch of the first sub-gear is shifted in a negative direction when the clutch of the second sub-gear transmits a moment. The position of that touch point can now be used to calculate the moment of the clutch engagement of the first sub-gear. The real moment and also the moment on the clutch of the second sub-gear are known. Thus, one can calculate the parameter $\alpha_0$. The method can be performed with "exchanged roles" to determine the parameter $\beta_0$.

The actuator positions can be calculated preferably from the required moments in the invention-based method. The determination of the actuator positions from the required moments may also be required, along with the modeling of the moments from the actuator positions. Here one could preferably in a first step calculate the base moments ($M_{RO1}$ and $M_{RO2}$) from which one can determine the positions via the inverse base characteristic diagrams.

Furthermore, an override due to a suitable touch-point shift or the like can be considered in the invention-based method. Here it can be assumed that the change of the characteristic moment diagrams of the individual clutches is simply caused by a shift of the touch points of the two sub-clutches. This is why the base characteristic diagrams are simply shifted to calculate the characteristic diagrams: the shift can be performed, for example, in proportion to the moment at the other particular clutch. It is also conceivable to perform a different kind of shift.

$A_1$ and $A_2$ are used as proportionality parameters. The calculation of the moments can be improved iteratively in a first step:

$$M_{1\_(i+1)} = M_{RO1}(Pos1 - A_1 M_{2\_(i)}) \text{ and } M_{2\_(i+1)} = M_{RO2}(Pos2 - A_2 M_{1\_(i)})$$

A second iteration may already be sufficient to bring about a definite improvement of the results. Only marginal changes in calculated moments can be determined after at most four iterations. For adaptation, only the touch-point shift, caused by the other particular clutch, should be considered.

$$A_1 = \frac{\Delta TP_1}{M_{R2}} \text{ and } A_2 = \frac{\Delta TP_2}{M_{R1}}$$

According to another development, one can observe the idling moment of the engine in case of a normal touch-point adaptation, whereas, for example, the clutch of the first sub-gear is depressed. The other particular sub-gear of the double clutch here, however, does no transmit any moment. But it is possible that the clutch of the second sub-gear is in the neutral state or is placed in such a state. Then the other pertinent clutch can also be depressed. The moment of coupling of the second sub-gear is known via the adapted base characteristic diagrams ($M_{RO2}(Pos2)$).

One can now determine the touch-point position, for example, by observing the idling moment of the combustion engine. That is no problem for the clutch engagement by means of which the car is started, for example, the clutch engagement of the first sub-gear because its gear remains engaged. To determine the touch-point shift of the clutch of the second sub-gear, which is not used to start the car, the clutch can be released for starting purposes and the gear can be engaged before the starting process is begun.

In the case of a vehicle that is jacked up, for example, when the drive wheels do not have any contact with the ground, similar to the way this happens in the case of touch-point adaptation, one can determine the touch-point shift without using the sensors that detect the number of revolutions of the primary shaft. When the combustion engine is running (idling) and when a gear has been engaged in both sub-gears, one can for this purpose first of all depress the clutch of the first sub-gear with a high friction moment. That causes the wheels to start to turn. If the clutch of the second sub-gear is depressed cautiously, then during moment transmission, the gear will become stuck and that has a braking effect on the combustion engine. This means that the touch point can be recognized, as in the case of touch-point adaptation, by the engine's idling moment. This process, for example, can be employed preferably at the conveyor belt end in a production plant.

According to a development of the invention, it is also possible to use at least one sensor to detect the number of revolutions of the primary shaft in order to determine a touch-point shift. If sensors for the numbers of revolutions of the primary shaft are present in the gear used, for example, in case of a slippage adjustment, these sensors can be used to determine the shifts of the touch points.

While the vehicle is in motion, a gear, for example, of the first sub-gear where the corresponding clutch transmits a known moment, the other second sub-gear is switched to neutral. As the other clutches are depressed, the depression of the clutch can be recognized by the primary shaft revolution number sensor, and in that way, one can determine the shift of the touch point.

The invention-based method furthermore can also provide a base initialization in systems with slippage regulation. Because a change of the transmissible moment in one clutch in each case influences the moment on the other clutch, this influence can also be used directly in systems with slippage regulation. For example, when driving with the clutch of the first sub-gear, the other clutch can be put into neutral. In that way, the other clutch can then be depressed. This depression of the other clutch results in a shift of the characteristic line of the clutch of the first sub-gear. This shift of the characteristic line is balanced out by the slippage regulation. In that way, the shift can be measured by the slippage regulation. This shift precisely corresponds to the shift of the touch point.

The consideration of the friction values in response to the override is also described here.

The modeling of the characteristic lines of the clutch can be further improved. In keeping with the real-life situation, it is not the moments of one clutch that are responsible for the change of the characteristic line of the other particular clutch, but rather the supporting forces on the clutch cover. This means that the override parameters $A_1$ and $A_2$ will change with the friction values ($p_1$, $p_2$) of the individual clutches.

$$A_1 p_1 = \text{const. and } A_2 p_1 = \text{const.}$$

But these relationships do not consider the influence from the wear and tear of the clutches that have an effect on the override via altered actuation forces. Nevertheless, brief changes in the friction values can be considered as following with regard to the override parameters:

$$A_{1\_new} = \frac{P_{2\_old}}{P_{2\_new}} A_{1\_old} \quad \text{and} \quad A_{2\_new} = \frac{P_{1\_old}}{P_{1\_new}} A_{2\_old}$$

In that way, one can bridge the time between the adaptations of the override parameters. On the whole, the invention-based method can be further improved in that by virtue of the touch-point shift during override, at least one friction value of one clutch can be considered.

In comparing the several methods for considering the override, it can be stated that the method with which the overlap is performed by virtue of touch-point shifts is definitely simpler to handle. This can be recognized already by virtue of the fact that only two or perhaps even only one additional parameter would have to be adapted. Furthermore, no adaptation is required in situations where both clutches transmit a relatively large moment. The calculation of the required positions from the required moments is also definitely simpler. On the other hand, the description of the override by way of direct-moment influencing is more general.

The invention-based strategies can generally be employed for PSG systems with double clutches and with only one clutch cover. One must always figure on a mechanical clutch coupling between the two clutches in the case of double clutches. A precise modeling of the clutch moments during overlap is possibly not required because this overlap is either much too short to detect deviations in the clutch moments. On the other hand, it is also possible to adjust deviations in a suitable manner.

The object of the invention is also attained by an interruption-free gearbox, in particular, a parallel gearbox for a vehicle with a double clutch, especially to implement the proposed method, whereby at least one triggering device is provided which, as a function of the particular base moment characteristic diagram of each clutch, prepares a common moment characteristic diagram for the purpose of triggering the double clutches.

Other advantages and advantageous embodiments will result form the subclaims and the drawing described below. The only figure of the invention at hand presents an overview of the ranges for the determination of the following different, more precisely described parameters in a moment chart according to the invention at hand.

Two possibilities are offered by the invention for the purpose of providing characteristic moment diagrams for the two sub-clutches. In both cases, the characteristic diagrams of the individual clutches, referred to as characteristic base diagrams below, are used as foundation.

From the characteristic diagram tables for the sub-clutch of the first sub-gear

| Pos1$_{\_1}$ | Pos1$_{\_2}$ | ... | Pos1$_{\_n}$ |
|---|---|---|---|
| M$_{RO1\_1}$ | M$_{RO1\_2}$ | ... | M$_{RO1\_n}$ | and for the sub-clutches of the second sub-gear

| Pos2$_{\_1}$ | Pos2$_{\_2}$ | ... | Pos2$_{\_n}$ |
|---|---|---|---|
| M$_{RO2\_1}$ | M$_{RO2\_2}$ | ... | M$_{RO2\_n}$ | functions can be given, preferably via a linear interpolation, which functions calculate the clutch moments from the given actuator positions (Pos1 and Pos2):

$M_{RO1}(P_{os1})$ and $M_{RO2}(P_{os2})$.

These tables, however, can also be used in the same fashion in order, from a required moment, to calculate the required actuator position:

$L_1(M1)$ and $L_2(M2)$.

The base characteristic diagrams ($M_{RO1}$(Pos1) and $M_{RO2}$(Pos2)) can, during startup and during the synchronization phase, be adapted preferably separately in gearboxes.

Overriding can be considered in two different ways.

First of all, overriding due to moment influencing can be considered. Here, the changes in the clutch moments as a function of the moment on the other clutch can be considered directly. We get the following for the calculated ($M_1$(Pos1, Pos2) and $M_2$(Pos1, Pos2)):

$$M_1(\text{Pos1},\text{Pos2})=M_{RO1}(\text{Pos1})-\alpha_0 M_{RO2}(\text{Pos2})-\alpha_1 M_{RO1}(\text{Pos1})M_{RO2}(\text{Pos2})$$

and $$M_2(\text{Pos1},\text{Pos2})=M_{RO2}(\text{Pos2})-\beta_0 M_{RO1}(\text{Pos1})-\beta_1 M_{RO1}(\text{Pos1})M_{RO2}(\text{Pos2}).$$

Accordingly, one can also adapt the four override parameters $\alpha_0$, $\alpha_1$, $\beta_0$ and $\beta_1$. To determine these parameters, one can compare the calculated values for the clutch moments ($M_1$(Pos1, Pos2) and $M_2$(Pos1, Pos2)) and the real, measured clutch moments ($M_{R1}$(Pos1, Pos2 and $M_{R2}$(Pos1, Pos2). But one should in this case always use positions where both clutches transmit one moment, because otherwise, there is no override.

Methods for the determination of the touch-point shift are also considered. By way of example, a reduction of the sum moment is provided preferably at the start and end of a changeover gearbox. When both clutches slip and when the engine moment is known, the sum moment can be determined from the change in the number of revolutions of the engine.

$$M_1+M_2=(1-\alpha_0)M_{RO2}(\text{Pos2})+(1-\beta_0)M_{RO1}(\text{Pos1}).$$

If $$M_{RO2}(\text{Pos2})>>M_{RO1}(\text{Pos1}),$$

which, for example, occurs at the start of a 2→1 changeover or at the end of a 1→2 changeover, then one can neglect the term $\beta_0 M_{RO1}$(Pos1). If now the measured sum moment $$M_{R1}(\text{Pos1},\text{Pos2})+M_{R2}(\text{Pos1},\text{Pos2})$$

is equated with the calculated moment, then we get $$M_{R1}+M_{R2}=M_{RO1}(\text{Pos1})+M_{RO2}(\text{Pos2})-\alpha_0 M_{RO2}(\text{Pos2}).$$

From this, we get the override parameter $\alpha_0$:

$$\alpha_0 = \frac{M_{RO2}(Pos2) + M_{RO1}(Pos1) - (M_{R1} + M_{R2})}{M_{RO2}(Pos2)}$$

The amount of $\beta_0$ can now be determined in an analogous fashion.

The sum $\alpha_1+\beta_1$ is also determined. Here again, one should make full use of the sum moment of both clutches. Of course, the sum moment in the middle of the changeover is decisive. When both clutches slip and when the engine moment is known, the sum moment can be determined from the change in the numbers of revolutions of the engine. The determined parameters are indicated on the basis of the moment chart in the figure.

The actuator positions are calculated below from the required moments. The determination of the actuator positions from the required moments is also required along with the modeling of the moments from the actuator positions. Here, one may preferably calculate the base moments ($M_{RO1}$ and $M_{RO2}$) in a first step, and from them, one can then determine the positions via the inverse base characteristic diagrams.

From the following equations:

$$A = \alpha_0\beta_1 + \alpha_1;\ B = \beta_1 M_1 - \alpha_1 M_2 + \alpha_0\beta_0 - 1 \text{ and } C = M_1\beta_0 + M_2$$

we get the following:

$$M_{RO2} = \frac{-B - \sqrt{B^2 - 4AC}}{2A} \text{ and } M_{RO1} = \frac{M_1 + \alpha_0 M_{RO2}}{1 - \alpha_1 M_{RO2}}$$

The required actuator positions can then be calculated via the $L_1(\ )$ and $L_2(\ )$ characteristic diagram functions.

Furthermore, override can be considered by means of suitable touch-point shift. Here it can be assumed that the change in the characteristic moment diagrams of the individual clutches is caused simply by a shift of the touch points of the two sub-clutches. This is why the base characteristic diagrams were simply shifted here to calculate the characteristic diagrams: the shift, for example, can take place in proportion to the moment at the other particular clutch. It is also conceivable to perform a different kind of shift.

The characteristic diagrams can be calculated by means of a simple shift of the base characteristic diagrams $M_{RO1}$(Pos1) and $M_{RO2}$(Pos2).

$$M = M_{RO1}(Pos1 - \Delta TP1) \text{ and } M_2 = M_{RO2}(Pos2 - \Delta TP2),$$

as a result of which, the following proportionality applies:

$$M_1 = M_{RO1}(Pos1 - A_1 M_{R2}(Pos1, Pos2) \text{ and } M_2 = M_{RO2}(Pos2 - A_2 M_{RO1}(Pos\ 1, Pos2)).$$

The real moments $M_{R1}$(Pos1, Pos2) and $M_{R2}$(Pos1, Pos2) are not known for modeling purposes; therefore, for the time being, we will start with:

$$M_{1\_1} = M_{RO1}(Pos1 - A^1 M_{RO2}(Pos2)) \text{ and } M_{2\_1} = M_{RO2}(Pos2 - A_2 M_{RO1}(Pos\ 1)).$$

Here, $A_1$ and $A_2$ are the proportionality parameters. The calculation of the moments can be improved iteratively by starting with this first step:

$$M_{1\_(i+1)} = M_{RO1}(Pos1 - A_1 M_{2\_(i)}) \text{ and } M_{2\_(i+1)} = M_{RO2}(Pos2 - A_2 M_{1\_(i)})$$

Here, a second iteration might already be sufficient to achieve a definite improvement in the results. Only marginal changes can be detected in the calculated moments at the latest after four iterations. For purposes of adaptation, one should now simply determine the touch-point shift caused by the other particular clutch.

$$A_1 = \frac{\Delta TP_1}{M_{R2}} \text{ and } A_2 = \frac{\Delta TP_2}{M_{R1}}$$

The calculation of the clutch moments is furthermore described from the actuator positions. The following magnitudes may be given here:

| Actuator positions: | Pos1 | Pos2 |
| --- | --- | --- |
| Characteristic diagram functions: | $M_{RO1}(\ )$ | $M_{RO2}(\ )$ |
| Override parameters: | $A_1$ | $A_2$ |

The following magnitudes are wanted:
Clutch moments: $M_1\ M_2$
As first step 1, the calculation can comprise the following:

$$M_{1\_0} = M_{RO1}(Pos1) \text{ and } M_{2\_0} = M_{RO2}(Pos2)$$

This is followed by the first iteration 1:

$$M_{1\_1} = M_{RO1}(Pos1 - A_1 M_{2\_0}) \text{ and } M_{2\_1} = M_{RO2}(Pos2 - A_2 M_{1\_0})$$

Other iterations may possibly follow:

$$M_{1\_i+1} = M_{RO1}(Pos1 - A_1 M_{2\_i}) \text{ and } M_{2\_i+1} = M_{RO2}(Pos2 - A_2 M_{1\_i}).$$

In an advantageous manner, the method converges so well that one or two iteration steps will yield adequate accuracy. From that, one gets four or six interpolation calculations of one base characteristic diagram.

When both couplings do not transmit one moment, then it may be sufficient to perform an interpolation calculation to calculate the moment on the active clutch.

A calculation of the actuator positions from the required moments is also described. The following magnitudes may be given here:

| Required moments: | $M_1$ | $M_2$ |
| --- | --- | --- |
| Characteristic diagram functions: | $L_1(\ )$ | $L_2(\ )$ |
| Override parameters: | $A_1$ | $A_2$. |

Then we look for the actuator positions:
Pos1 Pos2.
The calculation can be performed as follows:

$$Pos1 = L_1(M_1) + A_1 M_2 \text{ and } Pos2 = L_2(M_2) + A_2 M_1.$$

This means that only two interpolation calculations of one base characteristic are required here.

The invention claimed is:

1. A method for controlling a clutch, in particular, a double clutch of an interruption-free gearbox, in particular, a parallel gearbox, said method comprising:
    preparing a common moment characteristic diagram as a function of the respective base moment characteristic diagrams of each clutch in said double clutch; and,
    controlling said each clutch using the common moment characteristic diagram.

2. The method according to claim 1 wherein the double clutch comprises first and second clutches with respective moment characteristic diagrams, respective actuator positions regarding the first and second sub-clutches are given, and respective required moments for the first and second clutches are known; and,
    the method further comprising, for each of the first and second clutches:
    linearly interpolating a respective moment characteristic diagram to determine first and second functions, where the interpolating is during a course of a clutch coupling moment via a respective actuator position;

using the first function to determine a respective clutch moment from the respective given actuator position; and, using the second function to determine a respective required actuator position from the respective required moment.

3. The method according to claim 1 wherein each respective base moment characteristic diagram further comprises respective fields and the interruption-free gearbox operates in start up and a synchronization phase; and, the method further comprising:

for said each clutch, separately adapting the respective fields during the startup and/or during the synchronization phase.

4. The method according to claim 1 wherein the common characteristic diagram further comprises properties of the double clutch and the interruption-free gearbox comprises parameters such as a change in the friction number, wear and tear and/or adjustment; and, the method further comprising:

changing the properties responsive to the parameters.

5. The method according to claim 1 further comprising:
overriding the control of the clutches in the double clutch by means of moment influencing.

6. The method according to claim 5 wherein overriding the control of the clutches by means of moment influencing further comprises adapting several override parameters.

7. The method according to claim 6 further comprising:
calculating values for moments of the double clutch;
measuring real moments for the double clutch; and,
comparing the calculated values and the real moments to determine the override parameters.

8. The method according to claim 6 wherein the double clutch is asymmetrically loaded; and, the method further comprising:

determining the override parameters in conjunction with the asymmetrical loading of the double clutch.

9. The method according to claim 6 wherein the double clutch is in a first sliding state; and, the method further comprising:

determining the override parameters in the first sliding state.

10. The method according to claim 9 wherein determining the override parameters in the first sliding state further comprises determining only a sum of override parameters $\alpha_1$ and $\beta_1$ according to the following equation:

$$\alpha_1 + \beta_1 = \frac{(1-\beta_0)M_{RoI}(PosI) + (1-\alpha_0)M_{RO2}(Pos2) - (M_{RI} + M_{R2})}{M_{RoI}(PosI)M_{RO2}(Pos2)}.$$

11. The method according to claim 6 further comprising:
determining override parameters $\alpha_0$ and $\beta_0$ according to the following equations:

$$\alpha_0 = \frac{M_{ROI}(PosI) - M_{RI}(PosI, Pos2)}{M_{RO2}(Pos2)}$$

$$\beta_0 = \frac{M_{RO2}(Pos2) - M_{R2}(PosI, Pos2)}{M_{RoI(PosI)}}.$$

12. The method according to claim 6 wherein adapting several override parameters further comprises adapting at least one parameter.

13. The method according to claim 6 wherein the double clutch is in a second sliding state and an engine moment is known; and, the method further comprising:

determining a sum moment from a change in a number of revolutions of the engine.

14. The method according to claim 6 wherein required moments are known and the interruption-free gearbox comprises actuators; and, the method further comprising:

calculating positions of the actuators from the required moments.

15. The method according to claim 6 wherein inverse base characteristic diagrams are available for the double clutch; and, the method further comprising:

calculating base moments via inverse base characteristic diagrams.

16. The method according to claim 1 wherein the double clutch comprises third and fourth clutches; and, the method further comprising:

changing a clutch moment for the third clutch in the common characteristic diagram as a function of a moment of the fourth clutch.

17. The method according to claim 1 further comprising:
overriding, during the control of said each clutch, by means of a suitable touch-point shift.

18. The method according to claim 17 wherein the double clutch comprises fifth and sixth clutches with respective base characteristic diagrams; and, the method further comprising:

shifting the base characteristic diagram of the fifth clutch.

19. The method according to claim 18 wherein the sixth clutch has a clutch moment and shifting the base characteristic diagram further comprises shifting in proportion to the clutch moment of the sixth clutch.

20. The method according to claim 18 further comprising:
determining proportionality parameters $A_1$ and $A_2$ according to the following equations for the purpose of an adaptation of the characteristic diagram:

$$A_1 = \frac{\Delta TP_1}{M_{R2}} \text{ and } A_2 = \frac{\Delta TP_2}{M_{RI}}.$$

21. The method according to claim 18 wherein the interruption-free gearbox comprises first and second sub-gears with respective clutches, a gear from each of the first and second sub-gears is engaged, the engine is idling, and there is a touch-point adaptation; and, the method further comprising:

depressing the respective clutch of the first sub-gear up to a high friction moment;

depressing the respective clutch of the second sub-gear; and, prestressed the second sub-gear so that a touch point is determined on a basis of the engine's idling moment.

22. The method according to claim 21 wherein the second sub-gear comprises a primary shaft and the interruption-free gearbox comprises at least one sensor; and, the method further comprising:

using the at least one sensor to determine a number of revolutions of the primary shaft to determine a touch-point shift.

23. The method according to claim 22 wherein the at least one sensor is a primary shaft revolution number sensor; and, the method further comprising, during a driving state with the first sub-gear:

transmitting a moment and switching the second sub-gear to neutral; and, as the respective clutch of the second sub-gear is depressed, the primary shaft revolution number sensor recognizing the depression of the respective clutch and determining a shift of a touch point.

24. The method according to claim 17 wherein the interruption-free gearbox comprises slip regulation; and, the method further comprising:

using the slip regulation to determine a touch-point shift.

25. The method according to claim 24 wherein the interruption-free gearbox comprises third and fourth sub-gears with respective clutches; and, the method further comprising, during the driving state with the third sub-gear:

transmitting a moment and switching the fourth sub-gear to neutral; and, depressing the respective clutch for the fourth sub-gear and balancing out a touch-point shift by slippage regulation so that an existing shift can be determined.

26. The method according to claim 17 wherein said each clutch has a respective friction value due to a touch-point shift during override; and, the method further comprising:

considering a respective friction value.

27. An interruption-free gearbox, in particular, a parallel gearbox for a vehicle with a double clutch, in particular, for the purpose of implementing the method according to claim 1, comprising:

at least one control device, where said at least one control device is arranged to prepare a common moment characteristic field as a function of a respective base moment characteristic diagram of each clutch in the double clutch; and, control the double clutch using the common moment characteristic field.

* * * * *